United States Patent [19]

Adams et al.

[11] Patent Number: 5,709,937
[45] Date of Patent: Jan. 20, 1998

[54] CLEAR CONFORMABLE ORIENTED FILMS AND LABELS

[75] Inventors: Richard C. Adams, Chardon; Donald F. Kimes, Perry, both of Ohio; Karl Josephy, Los Angeles, Calif.

[73] Assignee: Avery Dennison Corporation, Pasadena, Calif.

[21] Appl. No.: 372,299

[22] Filed: Jan. 13, 1995

[51] Int. Cl.[6] .............. B32B 27/05; C08L 23/00; C08L 23/40; C08L 3/00
[52] U.S. Cl. .............. 428/332; 428/515; 428/516; 525/240; 524/400
[58] Field of Search .............. 428/515, 516, 428/343, 352, 332; 525/240; 524/400

[56] References Cited

U.S. PATENT DOCUMENTS

| | | | |
|---|---|---|---|
| 4,297,415 | 10/1981 | Ward et al. | 428/516 |
| 4,302,504 | 11/1981 | Lansbury et al. | 428/332 |
| 4,439,478 | 3/1984 | Ferguson et al. | 428/137 |
| 4,581,262 | 4/1986 | Karabedian | 428/35 |
| 4,585,679 | 4/1986 | Karabedian | 428/35 |
| 4,769,284 | 9/1988 | Kakugo et al. | 428/349 |
| 4,923,722 | 5/1990 | Kondo et al. | 428/34.9 |
| 5,186,782 | 2/1993 | Freedman | 156/244.11 |
| 5,338,790 | 8/1994 | Chatterjee | 524/400 |
| 5,372,669 | 12/1994 | Freedman | 156/243 |
| 5,455,092 | 10/1995 | Tung | 428/40 |

*Primary Examiner*—John J. Zimmerman
*Assistant Examiner*—Michael LaVilla
*Attorney, Agent, or Firm*—Renner, Otto, Boisselle & Sklar

[57] ABSTRACT

Machine-direction oriented polypropylene homopolymer and propylene copolymer films are described wherein the propylene copolymer is one selected from the group consisting of propylene-ethylene copolymers containing up to about 10% by weight of ethylene and propylene-1-butene copolymers containing up to about 15% by weight of 1-butene wherein the oriented films has an opacity of less than about 10% and a haze of about 10% or less in the machine-direction and in the cross-direction.

49 Claims, 1 Drawing Sheet

CLEAR CONFORMABLE ORIENTED FILMS AND LABELS

FIELD OF THE INVENTION

This invention relates to a method of preparing clear machine-direction oriented monolayer and multilayer films. The invention also relates to the preparation of labels and other composites using such machine-direction oriented polymer films.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage and allows for efficient handling of an array of individual labels after the labels are die-cut and the matrix is stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

In many label applications, it is desirable that the facestock material be a film of polymeric material which can provide properties lacking in paper, such as clarity, durability, strength, water-resistance, abrasion-resistance, gloss and other properties. Historically, facestock material of thicknesses greater than about 3 mils have been used in order to assure dispensability in automatic labeling apparatuses. However, it is desirable to reduce the thickness or "down-gauge" the facestock material in order to attain savings in material costs. Such reduction in label thickness often has resulted in reduced stiffness and the inability to dispense the labels in a reliable commercially acceptable manner using automatic machinery.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. The release level also is dependent upon the stiffness of the facestock. Failure to dispense may also be characterized by the wrinkling of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

Recently, to achieve the cost savings afforded by down-gauged film, polymeric materials which have been suggested in the prior art as useful in preparing labels include polymeric biaxially-oriented polypropylene ("BOPP") of thicknesses down to about 2.0 mils which is relatively inexpensive and dispenses well. Such films tend to have sufficient stiffness for dispensing, but they also have relatively high tensile modulus values in both machine-direction (MD) and cross direction (CD) which results in unacceptable conformability characteristics. When the biaxially-oriented films are applied to rigid substrates such as glass bottles, the application is not completely successful due to the tendency of the relatively stiff label to bridge surface depressions and mold seams resulting from bottle-forming processes which results in an undesirable surface appearance simulating trapped air bubbles. This has impeded the use of pressure-sensitive adhesive labels to replace prior glass bottle labeling techniques such as ceramic ink directly bonded to the bottle surface during glass bottle manufacturing processes. Such ceramic ink techniques are environmentally undesirable due to objectionable ink components and the contamination by the ink of the crushed bottle glass in recycling processing.

Other useful materials are unoriented polyethylene and polypropylene films that are also relatively inexpensive and conformable. However, both of these films are difficult to die-cut and do not dispense well at low calipers.

It is also desirable in some instances to use labels which are clear and essentially transparent on glass bottles. Many facestocks currently available for labels lack sufficiently low levels of opacity and haze to qualify for such uses.

Resinous film-forming materials which are blends of "soft" polar additives ("SPA") such as ethylene vinyl acetate copolymer (EVA) with low-cost olefin base materials such as polypropylene, polyethylene, or combinations thereof including propylene-ethylene copolymers, blends of polyethylene and polypropylene with each other, or blends of either or both of them with polypropylene-polyethylene copolymer have been suggested as useful in preparing die-cut labels. In U.S. Pat. No. 5,186,782, extruded heat-set polymeric films are described which are die-cut into labels and applied to deformable or squeezable workpieces after being treated differently in their lengthwise and cross directions so as to have different stiffnesses in the respective directions. The polymeric films described in the '782 patent include heat-set unilayer films, and specifically films of polyethylene, as well as multilayer films which may comprise a coextrudate including an inner layer, a skin layer on the face side of the coextrudate, and optionally a skin layer on the inside of the coextrudate opposite the face side. A pressure-sensitive adhesive layer is generally applied to the inner side of the coextrudate. Preferred materials disclosed for use in the skin and inner layers comprise physical blends of (1) polypropylene or copolymers of propylene and ethylene and (2) ethylene vinyl acetate (EVA) in weight ratios ranging from 50/50 to 60/40. The core material also may be polyethylene of low, medium or high density between about 0.915 and 0.965 specific gravity. Films made of olefin-SPA blends have too high a haze for use on certain glass bottle substrates.

The machine-direction-oriented labels of the present invention are to be contrasted with shrink-films consisting of stretched, unannealed films, sometimes used in sleeve-labeling applications wherein a sleeve or wrap of shrink film is placed around the circumference of a bottle or can or like container and heated to cause it to shrink into light, surrounding engagement with a container. Examples of such shrink film labels are found in U.S. Pat. Nos. 4,581,262 and 4,585,679. The tendency to shrink causes such film to tend to withdraw from any borders leaving exposed adhesive. The exposed adhesive presents a particular disadvantage in die-cut label applications since the exposed adhesive is unsightly and tends to catch dust.

SUMMARY OF THE INVENTION

Clear machine-direction oriented propylene homopolymer and copolymer films are described wherein the propylene copolymer is one selected from the group consisting of propylene-ethylene copolymers containing up to about 10% by weight of ethylene and propylene-1-butene copolymers containing up to about 15% by weight of 1-butene wherein the oriented film has an opacity of about 10% or less and a haze of about 10% or less in the machine-direction and in the cross-direction.

The machine-direction oriented polypropylene copolymer films may be monolayer films or multilayer films. The multilayer films of the invention which are oriented in the machine-direction comprise (A1) at least one skin layer comprising a propylene homopolymer or a propylene copolymer selected from the group consisting of propylene-ethylene copolymers containing up to about 10% of ethylene and propylene-1-butene copolymers containing from about 3% to about 15% by weight of 1-butene; and (A-2) at least one relatively thick inner layer comprising a propylene homopolymer or propylene copolymer selected from propylene-ethylene copolymers containing up to about 10% by weight of ethylene and propylene-1-butene copolymers containing up to about 15% by weight of 1-butene, mixtures thereof, or mixtures of a propylene homopolymer and one or more of said copolymers wherein the oriented multilayer film is characterized as having an opacity of less than about 10% and a haze of about 10% or less in the machine-direction and in the cross direction.

Die-cut labels are also described which comprise a composite comprising the extruded, machine-direction oriented polypropylene copolymer films of the present invention in combination with an adhesive associated with said copolymer films for adhering said label to a substrate.

Multilayer composites also are described which comprise a label facestock material comprising an extruded oriented multilayer film of the present invention, an adhesive layer associated with said facestock material, and a release-coated liner or carrier. Combinations of the labels of the present invention joined with layer of adhesive to a substrate such as glass bottles also are described.

DESCRIPTION OF THE PREFERRED EMBODIMENTS

The present invention, in one embodiment, relates to the discovery that machine-direction oriented propylene homopolymer and copolymer films can be prepared which are characterized as being clear and even crystal clear films when the propylene copolymers used to form the films are selected from the group consisting of propylene-ethylene copolymers containing up to about 10% by weight of ethylene and propylene-1-butene copolymers containing up to about 15% by weight of 1-butene. The oriented propylene films of the present invention have an opacity of about 10% or less and a haze of about 10% or less in the machine-direction and in the cross direction. Although copolymers of propylene-ethylene and propylene-1-butene are preferred copolymers useful in the present invention, blends of polypropylene and polyethylene or polypropylene and poly-1-butene are useful as well as blends of polypropylene, polyethylene and copolymers of propylene-ethylene, or blends of polypropylene and poly-1-butene with copolymers of propylene and 1-butene. In one preferred embodiment, the propylene copolymers are propylene-ethylene copolymers containing up to about 10% or less of ethylene and more often less than about 6% ethylenic content. Ethylenic contents of from about 0.2% to about 10% are useful. Preferably, the ethylene content is from about 3% to about 10% by weight and more preferably from about 3% to about 6% by weight. With regard to the propylene-1-butene copolymers, 1-butene contents, of up to about 15% by weight are useful. In one embodiment, the 1-butene generally may range from about 3% by weight up to about 15% by weight and in other embodiments the range may be from about 5% to about 15% by weight.

The propylene copolymers useful in preparing the machine-direction oriented propylene copolymer films of the present invention may be prepared by techniques well known to those skilled in the art, and many such copolymers are available commercially. For example, the copolymers useful in the present invention may be obtained by copolymerization of propylene with either ethylene or 1-butene using single-site metallocene catalysts. Such copolymers are available from Exxon Chemical Company and Dow Chemical Company.

Propylene copolymers are preferred in preparing the film and labels of the invention. Examples of the types of propylene copolymers which are useful in the present invention include Polypropylene DS6D20, a propylene random copolymer which contains about 3.2% by weight of ethylene and is available from Shell Chemical Company. This polymer has a melt flow of 1.9 g/10 min, a density of 0.895 g/cc at 23° C., a tensile yield strength of 3800 psi, and a yield elongation of 13%. The melting temperature of the copolymer (DSC) is 300° F. Polypropylene DS6D81 is a polypropylene random copolymer available from Shell Chemical Company which contains 5.5% by weight of ethylene. This random copolymer is characterized as having a melt flow of 4.5 g/10 min, a tensile yield strength of 3200 psi, a tensile yield elongation of 12% and a flexural modulus (1% secant) of 90,000 psi. Polypropylene SRD4-127 is a random copolymer of propylene and 1-butene containing from about 8% by weight of butene. This polymer is available from Shell Chemical Company and is characterized as having a melt flow of 8 g/10 min, an MD tensile modulus of 96,200 psi, and an MD elongation of 840%. These are recent commercial resins, and more recent examples of similar copolymers are SRD4-126, SRD4-128, SRD4-130, and SRD4-131. Polypropylene SRD4-104 is a random copolymer of propylene and 1-butene containing about 11% butene. This polymer is available from Shell Chemical Co. and is characterized as having a melt flow of 5.0 g/10 min. an MD tensile modulus of 90,700 psi and an MD elongation of 725%. Propylene SRD4-105 is a random copolymer of propylene and 1-butene containing about 14% by weight of 1-butene. This polymer is available from Shell Chemical Co. and is characterized as having a melt flow of 5.0 g/10 min, an MD tensile modulus of 65,500 psi and an MD elongation of 780%. An example of a propylene homopolymer useful in the present invention is the homopolymer identified as 5C97/5A97 available from Shell Chemical Co. This homopolymer is characterized as having a melt flow of 3.9 g/10 min, a melting point (DSC at second heat cycle) of 162° C., a tensile yield strength of 4,900 psi, a tensile yield elongation of 10% and a flexural modulus (1% secant) of 230,000 psi.

The machine-direction oriented propylene homopolymer and propylene copolymer films of the present invention may be monolayer films or multilayer films. The multilayer films of the present invention may comprise (A-1) at least one skin layer comprising a propylene homopolymer or propylene copolymer selected from the group consisting of propylene-ethylene copolymers containing up to about 10% of ethylene and propylene-1-butene copolymers containing up to about 15% by weight of 1-butene; and (A-2) at least one relatively thick inner layer comprising a propylene homopolymer or propylene copolymer selected from propylene-ethylene copolymers containing up to about 10% by weight of ethylene and propylene-1-butene copolymers containing up to about 15% by weight of 1-butene, mixtures thereof, or mixtures of a propylene homopolymer and one or more of said copolymers wherein the oriented multilayer film is characterized as having an opacity of about 10% or less and a haze of about 10% or less in the machine-direction and in the cross direction.

The skin layer or layers of the multilayer films preferably comprise propylene copolymers, and relatively thick inner layer (A-2) may comprise a propylene homopolymer or copolymer. Any of the propylene-ethylene copolymers and propylene-1-butene copolymers described above can be used in the skin layer or skin layers or in the inner layer. In one embodiment, the amount of ethylene or 1-butene in the copolymer of the inner layer is less than the amount of ethylene or 1-butene in the copolymer of the skin layer or layers.

The monolayer and multilayer films of the present invention may also contain antiblocking and/or nucleating agents. The addition of antiblocking agents to the film formulations reduces the tendency of the films to block during windup, regulates the slip and anti-static properties of the films and allows a smooth unwinding from the reels. Any of the antiblocking agents described in the prior art as useful additives modifying the properties of polymer films, and in particular, olefin polymer films, can be included in the film formulations of the present invention. Silicas with average particle sizes of about 2 microns or less can be utilized for this purpose, and only small amounts (for example, 1000 to 5000 ppm) of the fine silica are needed. Several antiblocking agents based on synthetic silica are available from A. Schulman, Inc., Akron, Ohio, under the general trade designation Polybatch®. These materials are antiblocking masterbatches and comprise free-flowing pellets comprising propylene homopolymers or copolymers and the synthetic silica. For example, Polybatch ABPP-05 comprises 5% synthetic silica in a propylene homopolymer; ABPP-10 comprises 10% synthetic silica in a propylene homopolymer; and ABPP-05SC comprises 5% synthetic silica and a random propylene copolymer. When the antiblocking agents are to be utilized in the preparation of the multilayer films of the present invention, the antiblocking agent generally is added to the skin layer formulations only.

Various nucleating agents can be incorporated into the film formulations of the present invention, and the amount of nucleating agent added should be an amount sufficient to provide the desired modification of the crystal structure while not having an adverse effect on the desired optical properties of the film. It is generally desired to utilize a nucleating agent to modify the crystal structure and provide a large number of considerably smaller crystals or spherulites to improve the transparency (clarity) of the film. Obviously, the amount of nucleating agent added to the film formulation should not have a deleterious affect on the clarity of the film. Nucleating agents which have been used heretofore for polymer films include mineral nucleating agents and organic nucleating agents. Examples of mineral nucleating agents include carbon black, silica, kaolin and talc. Among the organic nucleating agents which have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Sorbitol derivatives such as 1,3,2,4-dibenzylidene sorbitol, 1,3,2,4-di-para-methylbenzylidene sorbitol, and 1,3,2,4-di-para-methylbenzylidene sorbitol also are effective nucleating agents for polypropylenes. The amounts of nucleating agent incorporated into the film formulations of the present invention are generally quite small and range from about 1000 to 2000 or 5000 ppm. The nucleating agents may be incorporated in any or all of the layers of the multilayer films of the invention.

Figure 1:
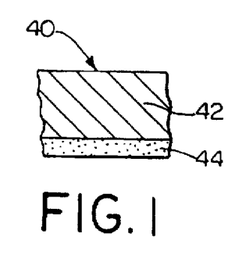
FIGS. 1–3 are cross-sections of label constructions useable in the practice of the invention.
Figure 2:
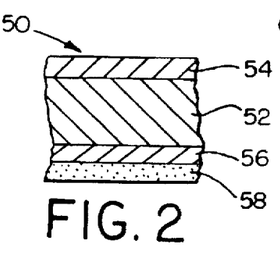
Figure 3:
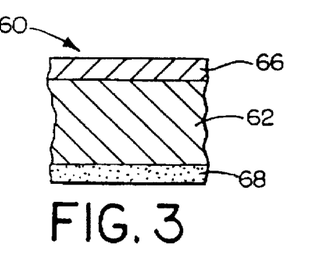

An example of a monolayer film useful in the present invention is illustrated in FIG. 1 as layer 42. In the embodiment illustrated in FIG. 1, an adhesive layer 44 is shown on the backside of the film 42 thereby illustrating a label 40 of the present invention. In FIG. 2, a multilayer construction, generally indicated by the reference numeral 50 is illustrated which comprises a coextrudate including an inner layer 52, a skin layer 54 on the face side of the coextrudate and a skin layer 56 on the back side of the coextrudate opposite the face side. In the embodiment illustrated in FIG. 2, an adhesive layer 58 is shown on the back side of the coextrudate. FIG. 3 illustrates another multilayer web construction generally indicated by the reference numeral 60 which comprises a coextrudate including an inner layer 62, and a skin layer 66 on the face side of the coextrudate. On the back side of the coextrudate is an adhesive layer 68.

The layers of the coextrudate of FIGS. 2 and 3 which comprise propylene copolymers (or optionally propylene homopolymer) are formed by simultaneous extrusion from a suitable known type of coextrusion die, and are adhered to each other in a permanently combined state to provide a unitary coextrudate.

The inner layer is relatively thick compared to the skin layer or layers. Thus, the inner layer may be about 2 to 20 times as thick as each of the skin layers. Examples of thickness ratios for two layer films such as represented in FIG. 3 include 90:10, 80:20, 70:30 etc. Thickness ratios for the three layered films such as shown in FIG. 2 include 5:90:5, 10:80:10, 15:70:15, 20:60:20, etc. The two skin layers do not have to be of equal thickness.

Figure 4A:
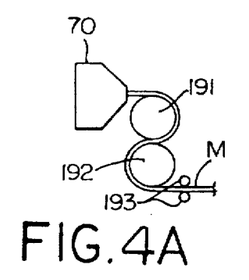
FIGS. 4A–4C schematically illustrate film extrusion and ensuing line processes pertinent to the invention.
Figure 4B:
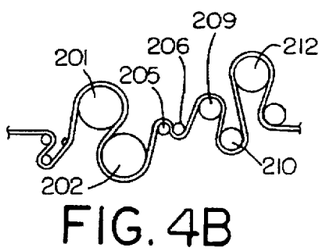
Figure 4C:
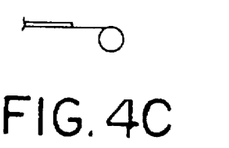

The extruded films which are machine-direction oriented may be prepared by the general procedure described and illustrated in FIGS. 4A–4C by extruding a charge of the desired propylene copolymer or by coextruding charges of the film-forming resins for the layers of the multilayer film to form extrudates.

Although FIG. 4A illustrates extrusion through cast film extrusion (i.e., through flat dies), the charge or charges for one or more layers can be extruded or coextruded in a known manner by blown film extrusion (i.e., by extrusion through circular dies) followed by passing of the blown stock between rolls.

With respect to the preferred embodiments, the charges may be prepared for extrusion or coextrusion through an extrusion die 70 and flat film casting, as schematically illustrated in FIG. 4A. The resin charge for the skin layers comprise, as noted above, a propylene copolymer as described herein. The resin charge for the inner layer comprises a homopolymer of propylene or a propylene copolymer as described above. The extruded film is cast on a first cooling roll 191, continues around a second cooling roll 192, and is advanced by pull-off rolls 193.

The stiffness of the film is important for proper dispensing of labels at higher line speeds. FIG. 4B illustrates a hot-stretching station at which the tensile modulus of the flat stock M is increased in the machine-direction, preferably at a stretch ratio of 7 or less, more preferably between 3 and 7, and most preferably at about 4 to 6. The increase in the MD tensile modulus of the film contributes to dimensional stability and good print registration. After passing around a pair of pre-heat rolls 201 and 202 which soften the stock, the softened stock is then stretched between the orientation roll pair 205 and 206, the latter rotating at a multiple of the speed of the pre-heat rolls, corresponding to the stretch ratio, say 5 to 1. The stock then passes over the annealing rolls 209, 210 at which it is annealed or heat-set, and finally passes over the chili roll 212 to complete the hot-stretch operation. The stock may then be taken up in roll form as seen in FIG. 4C.

The stiffness of the machine-direction-oriented single and multilayer films prepared by the general procedure described above should be at least about 10 and as high as 100 Gurley in the machine-direction. In one preferred embodiment, the films are characterized as having a Gurley stiffness in the machine-direction of from about 10 to about 60 and more often from about 10 to about 40. Stiffness is measured in accordance with the TAPPI Gurley Stiffness Test T 543 pm. In one embodiment, the tensile modulus in the cross-direction is substantially less than the tensile modulus in the machine-direction. In another embodiment, the tensile modulus in the cross-direction is less than about 0.75 times the tensile modulus in the machine-direction.

It is also preferred, for improved conformability, that the CD elongation is substantially greater than the MD elongation. Also, the CD elongation of the films of the invention will be greater than 30%, or 50%, or more often greater than 100%, and even greater than 300%.

Figure 5A:
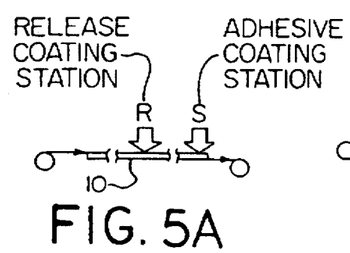
FIGS. 5A–5D schematically illustrate certain manufacturing steps related to the preparation of and use of the die-cut labels of the invention.
Figure 5B:
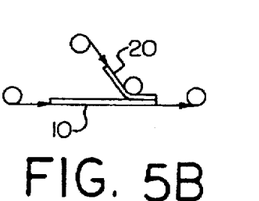

In the manufacture of label stock from the above-described films in accordance with the invention, liner or carrier stock 10 (FIG. 5A–5D) may be provided. The liner or carrier stock 10 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 10 may be coated with a release coating (e.g., a silicone) at station R, as shown in FIG. 5A. If a release coating is applied, it is dried or cured following application by any suitable means (not shown).

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 5A, adhesive may be applied at station S following drying or cure of the release coat previously applied at station R, this may be a tandem coating operation, or the adhesive coating may be on a separate coating line. Alternatively, the adhesive may be applied at some later time prior to the joining of the release liner or carrier 10 with the facestock 20. The joining of the liner or carrier with a facestock 20 is diagrammatically illustrated in FIG. 5B. Alternatively, the adhesive may be coated directly on the facestock 20 prior to the combining of the facestock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine-direction. The MD tensile properties of the facestock film are particularly important when a polymeric film liner is used or when no liner is required.

Figure 5C:
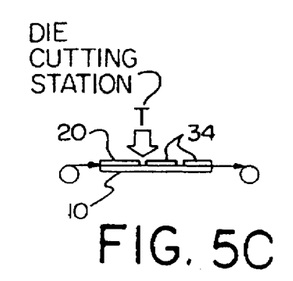

FIG. 5C diagrammatically illustrates the die-cutting of the facestock 20, at a station T, into a series of spaced pressure-sensitive labels 34 carried by the release liner or carrier 10. This step may be performed by rotary cutting dies in a well-known manner and involves the stripping of the ladder-shaped matrix (not shown) of waste or trim surrounding the formed labels when they are die cut (the "rungs" of the ladder representing the spacing between successive labels). The labels then remain on the liner in spaced relation with each other, as shown. One failure mode in this operation involves poorly die-cut labels remaining with the matrix as it is stripped. In this mode, as release levels decrease, poor die cutting is more likely to cause labels to stay attached to the matrix material and be removed from the liner during matrix stripping. Another failure mode results when the films being die-cut are of insufficient strength. As the strength of the matrix material decreases, the matrix tends to tear as the matrix around the die-cut labels is pulled from the liner. The films of the present invention do have sufficient strength to avoid or reduce breakage of the matrix on stripping.

Figure 5D:
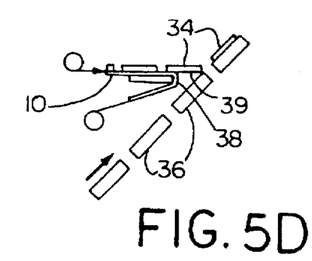

FIG. 5D illustrates the application of the labels 34 to passing workpieces 36 by use of a peel-back edge 38 to dispense the labels 34 by progressively removing the liner or carrier from them to thereby expose the adhesive side 39 of the labels and project the labels into contact with passing workpieces 36. In the context of the present invention, the workpieces 36 may constitute rigid substrates such as glass bottles or other rigid articles tending to have irregularities in the surface and therefore requiring labels that are flexible and that closely adhere (conform) to the surface without bridging local surface depressions.

It will be understood that the operations shown in FIGS. 5A to 5D may be done at different locations by different manufacturers, or they may be combined. For example, the steps of FIG. 5A may be performed by a liner and adhesive manufacturer, the steps of FIGS. 5B and 5C may be performed by a label manufacturer on one continuous pass rather than being interrupted by a wind/unwind sequence as illustrated, and the steps of FIG. 5D may be performed by a package of manufactured products.

Facestock which is formed into labels is usually wound and unwound in roll form, and is therefore one form of what is known as "roll stock" or "roll facestock," and the accompanying liner or carrier is called "roll liner."

The monolayer and multilayer films which have been machine-direction oriented at a stretch ratio of about 7 or less generally have a total thickness (caliper) of less than about 4 mils and more often, a caliper of about 3 mils or less such as in the range of about 2.0 to about 3.0 mils. The die-cut labels prepared from composites comprising the machine-direction oriented films and an adhesive layer provide acceptable labeling of rigid substrates such as glass with a label of sufficient flexibility and conformability to accommodate irregular or undulating glass surface characteristics resulting from the glass manufacturing process. Overly stiff label films such as biaxially oriented films tend to result in labels which bridge the depressions and mold seams in the glass surface, and the depressions appear as trapped air between the label and the glass surface.

The machine-direction oriented propylene copolymer films of the present invention, and labels prepared therefrom, are characterized as being clear or crystal clear. Thus, the oriented films of the present invention have an opacity of about 10% or less and a haze of about 10% or less in the machine-direction and in the cross direction. In one preferred embodiment the opacity and the haze are 8% or less. In another embodiment the haze is about 5% or less. The opacity of the films is measured using TAPPI Test T 425 os, and haze is measured in accordance with ASTM Test Method D-1003. The percent of ethylene in the propylene-ethylene copolymers and the percent of 1-butene in the propylene-1-butene copolymers, and the draw or stretch ratio in the machine-direction are controlled and may be varied to provide the desired clarity. In general, as the concentration of ethylene or 1-butene in the copolymers increases, the haze of the film decreases.

The clear copolymer films of the present invention may be obtained when the film is oriented at a stretch ratio in the machine-direction of about 7 or less. For example, when the copolymer film comprises a polypropylene-ethylene copolymer which contains from about 5% to about 6% of ethylene, clear films can be obtained at stretch ratios in the machine-direction of about 7 or less, and more often of about 5 or less. A stretch ratio of about 4 or less is useful when the copolymer is a propylene-ethylene copolymer which contains from about 3% to about 6% of ethylene. In particular, a propylene-ethylene copolymer containing about 5.5% ethylene provides a clear film when oriented in the machine-direction at a stretch ratio of about 5:1. When the copolymer film is a propylene-ethylene copolymer containing 3.2% ethylene, a stretch ratio of about 4:1 provides a clear film. Clear films also are obtained when a propylene-1-butene copolymers containing about 8% to 14% 1-butene are dram at a stretch ratios of about 4:1 and 5:1.

The following Examples illustrate the films of the present invention. Unless otherwise indicated in the following Examples and elsewhere in the specification and claims, all parts and percentages are by weight, temperatures are in degrees Centigrade, and pressures are at or near atmospheric pressure. The propylene homopolymer and copolymers used as components of the films in the following Examples are available from Shell Chemical Company and are identified in the following Table I. The antiblock agent used in some of the Examples is ABPP-05SC described above.

TABLE I

Commercial Polypropylene and Copolymers in Examples

| Reference in Examples | Commercial Designation | % Ethylene | % 1-Butene |
|---|---|---|---|
| Polypropylene | 5A97 | 0 | 0 |
| Copolymer A | 6D81 | 5.5 | 0 |
| Copolymer B | 6D20 | 3.2 | 0 |
| Copolymer C | WRD6-262 | 0.5 | 0 |
| Copolymer D | SRD4-126 | 0 | 8 |
| Copolymer E | SRD4-104 | 0 | 11 |
| Copolymer F | SRD4-105 | 0 | 14 |
| Copolymer G | SRD4-128 | 0 | 8 |
| Copolymer H | SRD4-131 | 0 | 8 |
| Copolymer I | SRD4-130 | 0 | 8 |

In Examples 1–19, monolayer films of propylene homopolymer and propylene copolymers are prepared by extrusion of the resin and resin blends by the general procedure illustrated in FIGS. 4A–4C at draw ratios of either 4:1 or 5:1 as indicated in the Examples using a laboratory size apparatus. The details of the film formulations, draw ratios and film thicknesses of Examples 1–19 are summarized in the following Table II.

TABLE II

Examples 1–19
Propylene Homopolymer and Copolymer Monolayer Films

| Example | Film Formulation Component | % w | Draw Ratio | Film Thickness (mils) |
|---|---|---|---|---|
| 1 | Polypropylene | 100 | 5:1 | 2.5 |
| 2 | Copolymer A | 100 | 5:1 | 2.0 |
| 3 | Copolymer A | 100 | 5:1 | 2.5 |
| 4 | Copolymer A | 100 | 5:1 | 3.0 |
| 5 | Copolymer A | 100 | 4:1 | 2.5 |
| 6 | Copolymer B | 100 | 4:1 | 2.5 |
| 7 | Copolymer B | 100 | 5:1 | 2.0 |
| 8 | Copolymer B | 100 | 5:1 | 2.5 |
| 9 | Copolymer B | 100 | 5:1 | 3.0 |
| 10 | Copolymer C | 100 | 5:1 | 2.5 |
| 11 | Copolymer A | 75 | 4:1 | 2.5 |
|  | Copolymer B | 25 |  |  |
| 12 | Copolymer A | 50 | 4:1 | 2.5 |
|  | Copolymer B | 50 |  |  |
| 13 | Copolymer A | 25 | 4:1 | 2.5 |
|  | Copolymer B | 75 |  |  |
| 14 | Copolymer A | 99 | 4:1 | 2.5 |
|  | Antiblock Agent | 1 |  |  |
| 15 | Copolymer A | 98 | 4:1 | 2.5 |
|  | Antiblock Agent | 2 |  |  |
| 16 | Copolymer A | 96 | 4:1 | 2.5 |
|  | Antiblock Agent | 4 |  |  |
| 17 | Copolymer D | 100 | 4:1 | 2.5 |
| 18 | Copolymer E | 100 | 4:1 | 2.5 |
| 19 | Copolymer E | 100 | 5:1 | 2.5 |

A monolayer facestock film is obtained in Examples 1–19 by preparing a charge of the film component or components in a blender prior to extrusion to provide a molten blend. The melt is then extruded as shown in FIG. 4A, and the film is then heated, stretched in the machine-direction only and heat set or annealed as illustrated in FIG. 4B. Stretching is in the machine-direction only so that there is essentially no stretching in the cross direction. The film may be combined with a pressure-sensitive adhesive-coated release liner in a manner similar to that shown in FIG. 5B, the adhesive thereby transferring to the film. Labels are die-cut from the films in a manner similar to that shown in FIG. 5C leaving the labels spaced from each other as shown. The stiffness of the film in the machine-direction is sufficient to allow the labels to be dispensed onto rigid substrates such as glass bottles at line speeds of about 500 to 550 bottles per minute.

The physical characteristics of the monolayer films of Examples 1–19 are listed in the following Table III. Tensile modulus (1% secant) and the percent elongation are determined at a crosshead speed of 5 in/min using ASTM test procedure D-882 for tensile properties of thin plastic sheeting. Stiffness is measured using TAPPI Test T 543 pm for testing the stiffness of paper using a Gurley stiffness tester.

TABLE III

Examples 1–19
Film Properties

| Example | Opacity % | Haze % | | Gurley Stiffness | Tensile Modulus (PSI) | | Elongation % | |
|---|---|---|---|---|---|---|---|---|
| | | MD | CD | MD | MD | CD | MD | CD |
| 1 | 7.5 | 6.8 | 6.4 | 39 | 378,000 | 182,000 | 47 | 23 |
| 2 | 7.1 | 2.9 | 2.8 | 10 | 203,000 | 110,000 | 36 | 635 |
| 3 | 7.0 | 3.9 | 3.7 | 18 | 195,000 | 116,000 | 56 | 673 |
| 3A | 7.2 | 1.4 | 1.4 | 20 | 256,000 | 109,000 | 45 | 558 |
| 4 | 7.0 | 1.6 | 1.4 | 32 | 215,000 | 105,000 | 57 | 777 |
| 4A | 7.1 | 1.7 | 1.6 | 32 | 243,000 | 117,000 | 58 | 614 |
| 5 | NA | NA | NA | NA | 212,000 | 119,000 | 62 | 609 |
| 6 | 7.2 | 2.5 | 2.2 | 25 | 268,000 | 140,000 | 54 | 526 |
| 7 | 7.1 | 5.9 | 5.7 | 11 | 225,000 | 121,000 | 33 | 472 |
| 8 | 7.1 | 6.0 | 5.7 | 23 | 275,000 | 138,000 | 41 | 384 |
| 9 | 7.1 | 6.8 | 6.4 | 31 | 182,000 | 113,000 | 43 | 474 |
| 10 | 7.2 | 6.2 | 5.9 | 33 | 332,000 | 190,000 | 35 | 5 |
| 11 | 7.2 | 1.7 | 1.5 | 23 | 224,000 | 119,000 | 84 | 686 |

TABLE III-continued

Examples 1–19
Film Properties

| Example | Opacity % | Haze % | | Gurley Stiffness | Tensile Modulus (PSI) | | Elongation % | |
|---|---|---|---|---|---|---|---|---|
| | | MD | CD | MD | MD | CD | MD | CD |
| 12 | 7.2 | 2.1 | 2.1 | 27 | 232,000 | 126,000 | 62 | 660 |
| 13 | 7.2 | 1.9 | 1.8 | 25 | 263,000 | 130,000 | 65 | 631 |
| 14 | 7.2 | 2.1 | 2.0 | 21 | 211,000 | 151,000 | 71 | 588 |
| 15 | 7.3 | 3.0 | 2.9 | 19 | 224,000 | 119,000 | 74 | 535 |
| 16 | 7.4 | 5.0 | 5.1 | 20 | 229,000 | 118,000 | 64 | 578 |
| 17 | 7.5 | 9.8 | 9.6 | 30 | 241,000 | 122,000 | 65 | 347 |
| 18 | 7.6 | 1.0 | 0.9 | NA | NA | NA | NA | NA |
| 19 | 7.4 | 1.8 | 1.8 | NA | NA | NA | NA | NA |

In the following Examples 20–34, multilayer films in accordance with the present invention are prepared. The multilayer films comprise an inner layer and one or more skin layers as indicated in the following Table IV. The compositions, thickness ratios, draw ratios and film thicknesses of the multilayer films of the Examples also are summarized in Table IV.

TABLE IV

Examples 20–34

| Example | Inner Layer Formulation | | Skin Layer(s) | | Thickness Ratio | Draw Ratio | Film Thickness (mils) |
|---|---|---|---|---|---|---|---|
| | Component | % w | Component | % w | | | |
| Propylene Copolymer Multilayer Films | | | | | | | |
| 20 | Copolymer B | 100 | Copolymer A | 100 | 10/80/10 | 5:1 | 2.5 |
| 21 | Polypropylene | 100 | Copolymer A | 100 | 10/80/10 | 5:1 | 2.5 |
| 22 | Copolymer A | 100 | Copolymer A Antiblock Agent | 98 2 | 0/90/10 | 4:1 | 2.5 |
| 23 | Copolymer A | 100 | Copolymer A Antiblock Agent | 96 4 | 0/90/10 | 4:1 | 2.5 |
| 24 | Copolymer A | 100 | Copolymer A Antiblock Agent | 98 2 | 10/80/10 | 4:1 | 2.5 |
| 25 | Copolymer E | 100 | Copolymer E Antiblock Agent | 96 4 | 10/80/10 | 5:1 | 2.5 |
| 26 | Copolymer E | 100 | Copolymer E Antiblock Agent | 96 4 | 10/80/10 | 4:1 | 2.5 |
| 27 | Copolymer F | 100 | Copolymer E Antiblock Agent | 96 4 | 10/80/10 | 4:1 | 2.5 |
| Propylene Homopolymer and Copolymer Multilayer Films | | | | | | | |
| 28 | Copolymer F | 100 | Copolymer E Antiblock Agent | 96 4 | 10/80/10 | 5:1 | 2.5 |
| 29 | Copolymer G | 100 | Copolymer G Antiblock Agent | 96 4 | 10/80/10 | 5:1 | 2.5 |
| 30 | Copolymer G | 100 | Copolymer G Antiblock Agent | 96 4 | 10/80/10 | 4:1 | 2.5 |
| 31 | Copolymer H | 100 | Copolymer H Antiblock Agent | 96 4 | 10/80/10 | 4:1 | 2.5 |
| 32 | Copolymer H | 100 | Copolymer H Antiblock Agent | 96 4 | 10/80/10 | 5:1 | 2.5 |
| 33 | Copolymer I | 100 | Copolymer I Antiblock Agent | 96 4 | 10/80/10 | 5:1 | 2.5 |
| 34 | Copolymer I | 100 | Copolymer I Antiblock Agent | 96 4 | 10/80/10 | 4:1 | 2.5 |

In each of Examples 20–34, the multilayer film is prepared by combining the charges for each of the film layers in blenders prior to extrusion to provide a molten blend. The melts are extruded as shown in FIG. 4A and are then heated, stretched in the machine-direction only and heat set or annealed as illustrated in FIG. 4B. The multilayer films may be combined with a pressure-sensitive adhesive coated release liner in a manner similar to that shown in FIG. 5B, the adhesive thereby transferring to the film. Labels may be die-cut from the film-adhesive-release liner composite in a manner similar to that shown in FIG. 5C leaving the label spaced apart from each other as shown when the matrix is stripped from the liner.

The physical characteristics of some of the multilayer films of Examples 20–34 are listed in the following Table V.

TABLE V

Examples 20–34
Multilayer Film Properties

| Example | Opacity (%) | Haze % MD | Haze % CD | Gurley (MD) | Tensile Modulus (PSI) MD | Tensile Modulus (PSI) CD | Elongation (%) MD | Elongation (%) CD |
|---|---|---|---|---|---|---|---|---|
| 20 | 7.2 | 6.4 | 6.0 | 25 | 304,000 | 138,000 | 44 | 528 |
| 21 | 7.5 | 8.0 | 7.5 | 33 | 374,000 | 160,000 | 38 | 29 |
| 24 | NA | NA | NA | NA | 201,000 | 112,000 | 70 | 325 |
| 25 | 7.8 | 6.0 | 6.0 | 20 | 314,000 | 144,000 | 53 | 535 |
| 26 | 7.5 | 4.2 | 4.2 | 17 | 253,000 | 133,000 | 77 | 908 |
| 27 | 7.6 | 5.1 | 5.0 | 16 | 216,000 | 117,000 | 67 | 878 |
| 28 | 7.8 | 7.8 | 7.6 | 24 | 279,000 | 129,000 | 42 | 834 |
| 29 | 7.3 | 5.2 | 5.1 | 31 | 307,000 | 133,000 | 58 | 397 |
| 30 | 7.3 | 4.4 | 4.2 | 30 | 246,000 | 120,000 | 73 | 555 |
| 31 | 7.3 | 5.2 | 5.0 | 25 | 217,000 | 121,000 | 89 | 568 |
| 32 | 7.3 | 5.7 | 5.6 | 36 | 289,000 | 125,000 | 56 | 576 |
| 33 | 7.3 | 6.7 | 6.5 | 36 | 265,000 | 134,000 | 44 | 564 |
| 34 | 7.4 | 6.9 | 6.7 | 23 | 223,000 | 119,000 | 53 | 832 |

The following Examples 35–37 are prepared utilizing the procedures illustrated in FIGS. 4A–4C as described earlier, but in these examples, the process is conducted on a larger scale commercial apparatus. Example 35 illustrates the preparation of a monolayer film, and Examples 36 and 37 illustrate the preparation of a 3-layer film. The formulations and draw ratios used in Examples 35–37 as well as the thickness ratios and film thicknesses are summarized in the following Table VI. Some of the properties of the films prepared in Examples 35–37 are summarized in the Following Table VII.

TABLE VI

Examples 35–37
Mono- and Multilayer Films

| Example | Inner Layer Component | % w | Skin Layer(s) Component | % w | Thickness Ratio | Draw Ratio | Film Thickness (mils) |
|---|---|---|---|---|---|---|---|
| 35 | Copolymer A | 100 | — | — | 0/100/0 | 4:1 | 2.5 |
| 36 | Copolymer A | 100 | Copolymer A<br>Antiblock Agent | 98<br>2 | 10/80/10 | 4:1 | 2.5 |
| 37 | Copolymer A | 100 | Copolymer A<br>Antiblock Agent | 96<br>4 | 10/80/10 | 4:1 | 2.5 |

TABLE VII

Examples 35–37
Film Properties

| Example | Opacity (%) | Haze (%) MD | Haze (%) CD | Gurley (MD) | Tensile Modulus (psi) MD | Tensile Modulus (psi) CD | Elongation (%) MD | Elongation (%) CD |
|---|---|---|---|---|---|---|---|---|
| 35 | 7.2[1] | 1.5[1] | 1.4[2] | 14[2] | 147,000[2] | 100,000[2] | 86.5[2] | 770[2] |
| 36 | 7.5 | 3.0 | 3.0 | 14 | 179,000 | 144,000 | 119 | 685 |
| 37 | 7.6 | 3.4 | 3.4 | 14 | 164,000 | 137,000 | 116 | 600 |

[1]Average of 5 rolls.
[2]Average of 4 rolls.

As can be seen from the properties reported in the above tables, the machine-direction oriented propylene homopolymer and propylene copolymer monolayer and multilayer films of the present invention are clear films and are characterized as having an opacity of 10% or less, more often 8% or less, and a haze of about 10% or less, and more often 8% or less and even 5% or less in the machine-direction and in the cross direction. These films are useful as facestocks in preparing labels, and more particularly, clear labels for application to various substrates including flexible as well as rigid substrates. In a preferred embodiment of the invention, the oriented films and labels of the invention exhibit sufficiently high CD elongation and lower CD tensile properties to be conformable to substrates. The films and labels of the invention also exhibit an MD stiffness sufficient to be readily dispensable onto substrates. The clear conformable labels prepared from the films of the invention are particularly useful on glass surfaces.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A machine-direction only oriented propylene homopolymer or copolymer film wherein the tensile modulus of the film in the cross-direction is less than about 0.75 times the tensile modulus of the film in the machine-direction, and the copolymer is selected from the group consisting of propylene-ethylene copolymers containing up to about 10% by weight of ethylene and propylene-1-butene copolymers containing up to about 15% by weight of 1-butene wherein the oriented film has an opacity of about 10% or less and the oriented film has a haze of about 10% or less in the machine-direction and in the cross-direction.

2. The film of claim 1 wherein the film is oriented at a stretch ratio in the machine-direction of about 7 or less.

3. The film of claim 1 wherein the film is a propylene-ethylene copolymer film which contains from about 0.2% to about 10% by weight of ethylene.

4. The film of claim 1 wherein the film is a propylene-ethylene copolymer film which contains from about 3% to about 10% by weight of ethylene.

5. The film of claim 1 wherein the film comprises a propylene-ethylene copolymer containing from about 3% to about 6% by weight of ethylene.

6. The film of claim 1 wherein the film is a propylene-1-butene copolymer film containing from about 3% to about 15% by weight of 1-butene.

7. The film of claim 1 wherein the film is a propylene-1-butene copolymer film containing from about 5% to about 15% by weight of 1-butene.

8. The film of claim 1 wherein the film has an opacity of less than about 8%.

9. The film of claim 1 wherein the film is a monolayer film.

10. The film of claim 1 wherein the film is an extruded multilayer film comprising an inner layer and at least one skin layer wherein the inner layer and the skin layer may comprise the same or different propylene homopolymers or copolymers.

11. The film of claim 1 wherein the thickness of the film is about 4 mils or less.

12. The film of claim 1 wherein the thickness of the film is about 3 mils or less.

13. The film of claim 1 wherein the film also contains up to about 5000 ppm of at least one nucleating agent.

14. A machine-direction only oriented propylene-ethylene copolymer monolayer film containing from about 3% to about 6% by weight of ethylene and which has been oriented in the machine-direction at a stretch ratio of between about 3 and about 4 whereby the tensile modulus of the film in the cross-direction is less than about 0.75 times the tensile modulus of the film in the machine-direction, and the monolayer film is characterized as having an opacity of about 10% or less and the monolayer film has a haze of about 5% or less in the machine-direction and in the cross direction.

15. The copolymer film of claim 14 wherein the opacity is less than about 8%.

16. A machine-direction only oriented propylene-ethylene copolymer monolayer film containing from about 5% to about 6% by weight of ethylene and which has been oriented in the machine-direction at a stretch ratio of from about 3 to about 5 whereby the tensile modulus of the film in the cross-direction is less than about 0.75 times the tensile modulus of the film in the machine-direction, and the monolayer film is characterized as having an opacity of about 10% or less and the monolayer film has a haze of about 5% or less in the machine-direction and in the cross direction.

17. The copolymer film of claim 16 wherein the opacity is less than about 8%.

18. An extruded multilayer film which has been oriented in the machine-direction only and which comprises:

(A-1) at least one skin layer comprising a propylene homopolymer or propylene copolymer selected from the group consisting of propylene-ethylene copolymers containing up to about 10% by weight of ethylene and propylene-1-butene copolymers containing up to about 15% by weight of 1-butene provided said at least one skin layer is free of (a) blends of said propylene homopolymer and said propylene-ethylene copolymer, blends of said propylene homopolymer and said propylene-1-butene copolymer; and (c) blends of said propylene-ethylene copolymer and said propylene-1-butene copolymer; and (A-2) at least one relatively thick inner layer comprising a propylene homopolymer or propylene copolymer selected from propylene-ethylene copolymers containing up to about 10% by weight of ethylene, and propylene-1-butene copolymers containing up to about 15% by weight of 1-butene, mixtures thereof, or mixtures of a propylene homopolymer and one or more of said propylene copolymers wherein the oriented multilayer film is characterized as having a tensile modulus in the cross-direction which is less than about 0.75 times the tensile modulus of the film in the machine-direction and an opacity of about 10% or less and the oriented multilayer film has a haze of about 10% or less in the machine-direction and in the cross direction.

19. The multilayer film of claim 18 wherein the inner layer comprises a propylene homopolymer.

20. The multilayer film of claim 18 wherein the at least one skin layer comprises a propylene-ethylene copolymer containing from about 0.2% to about 10% by weight of ethylene.

21. The multilayer film of claim 18 wherein the at least one skin layer comprises a propylene-ethylene copolymer containing from about 3% to about 10% by weight of ethylene.

22. The multilayer film of claim 18 wherein the at least one skin layer comprises a propylene-1-butene copolymer containing from about 5% to about 15% by weight of 1-butene.

23. The multilayer film of claim 18 wherein the film is oriented in the machine-direction at a stretch ratio of about 7 or less.

24. The multilayer film of claim 18 wherein the film is oriented in the machine-direction at a stretch ratio of about 5 or less.

25. The multilayer film of claim 18 wherein the film is oriented in the machine-direction at a stretch ratio of about 4.

26. The multilayer film of claim 18 having a Gurley stiffness in the machine-direction of between about 10 and about 60.

27. The multilayer film of claim 18 having a Gurley stiffness in the machine-direction of from about 10 to about 40.

28. The multilayer film of claim 18 wherein the thickness of the film is about 4 mils or less.

29. The multilayer film of claim 18 wherein the thickness of the film is about 3 mils or less.

30. The multilayer film of claim 18 wherein the at least one skin layer, or the inner layer or all layers contain up to about 5000 ppm of at least one nucleating agent.

31. The multilayer film of claim 18 wherein the percent elongation of the film in the cross-direction is at least about 30%.

32. The multilayer film of claim 18 wherein the percent elongation of the film in the cross-direction is at least about 300%.

33. The multilayer film of claim 18 wherein the inner layer or layers and skin layer or layers comprise a propylene copolymer, and the percent by weight of ethylene or 1-butene in the copolymer of the inner layer or layers is less than the percent by weight of ethylene or 1-butene in the at least one skin layer or layers.

34. The multilayer film of claim 21 wherein the haze is about 8% or less.

35. A label die-cut from a composite comprising:
(A) an extruded, machine-direction only oriented propylene homopolymer or propylene copolymer film wherein the tensile modulus of the film in the cross-direction is less than about 0.75 time the tensile modulus of the film in the machine-direction, and the copolymer is selected from the group consisting of propylene-ethylene copolymers containing up to about 10% by weight of ethylene and propylene-1-butene copolymers containing up to about 15% by weight of 1-butene wherein the oriented propylene homopolymer or propylene copolymer film has an opacity of about 10% or less and the oriented propylene homopolymer or propylene copolymer film has a haze of about 10% or less in the machine-direction and in the cross direction; and
(B) an adhesive layer in contact with one side of said oriented propylene homopolymer or propylene copolymer film for adhering said die-cut label to a substrate.

36. The label of claim 35 wherein the film (A) is oriented at a stretch ratio in the machine-direction of about 7 or less.

37. The label of claim 35 wherein the film (A) is a propylene copolymer film.

38. The label of claim 37 wherein the film is a propylene-ethylene copolymer which contains from about 3% to about 10% by weight of ethylene, and the stretch ratio is about 7 or less.

39. The label of claim 35 wherein the film (A) is a monolayer film.

40. The label of claim 35 wherein the film (A) is a multilayer film comprising an inner layer and at least one skin layer wherein the inner layer and the skin layer or layers may be the same or different propylene homopolymer or propylene copolymer.

41. A label die-cut from a composite comprising:
(A) an extruded multilayer film which has been oriented in the machine-direction only and which comprises
(A-1) at least one skin layer comprising a propylene homopolymer or propylene copolymer selected from the group consisting of propylene-ethylene copolymers containing up to about 10% by weight of ethylene and propylene-1-butene copolymers containing up to about 15% by weight of 1-butene;
(A-2) at least one relatively thick inner layer comprising a propylene homopolymer or propylene copolymer selected from propylene-ethylene copolymers containing up to about 10% by weight of ethylene and propylene-1-butene copolymers containing up to about 15% by weight of 1-butene, wherein the oriented multilayer film is characterized as having a Gurley stiffness in the machine-direction of from about 10 to about 100, a tensile modulus in the cross-direction which is less than about 0.75 times the tensile modulus of the film in the machine-direction and an opacity of about 10% or less and the oriented multilayer film has a haze of about 10% or less in the machine-direction and in the cross direction; and
(B) an adhesive layer in contact with one side of said oriented propylene homopolymer or propylene copolymer film for adhering said die-cut label to a substrate.

42. The label of claim 41 wherein the at least one inner layer (A-2) comprises a propylene homopolymer.

43. The label of claim 41 wherein the at least one skin layer (A-1) comprises a propylene-ethylene copolymer containing from about 3% to about 6% by weight of ethylene.

44. The label of claim 41 wherein the at least one skin layer (A-1) comprises a propylene-ethylene copolymer containing from about 5% to about 6% by weight of ethylene.

45. The label of claim 41 wherein the film (A) is oriented in the machine-direction at a stretch ratio of about 7 or less.

46. A multilayer composite comprising:
(A) a label facestock material comprising an extruded multilayer film which has been oriented in the machine-direction only and which comprises
(A-1) at least one skin layer comprising a propylene homopolymer or propylene copolymer selected from the group consisting of propylene-ethylene copolymers containing up to about 10% by weight of ethylene and propylene-1-butene copolymers containing up to about 15% by weight of 1-butene;
(A-2) at least one relatively thick inner layer comprising a propylene homopolymer or propylene copolymer selected from propylene-ethylene copolymers containing up to about 10% by weight of ethylene and propylene-1-butene copolymers containing up to about 15% by weight of 1-butene, wherein the oriented multilayer film is characterized as having a tensile modulus in the cross-direction which is less than about 0.75 times the tensile modulus of the film in the machine-direction and an opacity of about 10% or less and the oriented multilayer film has a haze of about 5% or less in the machine-direction and in the cross direction;

(B) an adhesive layer having an upper surface and a lower surface wherein the upper surface is in contact with one side of said facestock material (A) for adhering said label facestock material to a substrate; and (C) a release-coated liner or carrier in contact with the lower surface of the adhesive layer.

47. In combination, a label of claim 35 and a substrate.

48. The combination of claim 47 wherein the substrate is a rigid substrate.

49. The combination of claim 47 wherein the substrate is a glass bottle.

* * * * *